United States Patent
Amacker et al.

(10) Patent No.: US 12,200,040 B2
(45) Date of Patent: Jan. 14, 2025

(54) COMMUNICATION MANAGEMENT BETWEEN MESH-NETWORKED MOBILE NODES

(71) Applicant: TurbineOne, Inc., San Francisco, CA (US)

(72) Inventors: Matthew Warren Amacker, Santa Clara, CA (US); Ian Jay Kalin, San Francisco, CA (US)

(73) Assignee: TurbineOne, Inc., San Francisco, CA (US)

( * ) Notice: Subject to any disclaimer, the term of this patent is extended or adjusted under 35 U.S.C. 154(b) by 0 days.

(21) Appl. No.: 17/681,474

(22) Filed: Feb. 25, 2022

(65) Prior Publication Data
US 2022/0279052 A1    Sep. 1, 2022

Related U.S. Application Data

(60) Provisional application No. 63/299,828, filed on Jan. 14, 2022, provisional application No. 63/154,516, filed on Feb. 26, 2021.

(51) Int. Cl.
*G06F 15/16* (2006.01)
*G06F 9/48* (2006.01)
(Continued)

(52) U.S. Cl.
CPC ............ *H04L 67/04* (2013.01); *G06F 9/4881* (2013.01); *G06F 9/5027* (2013.01);
(Continued)

(58) Field of Classification Search
CPC ..... H04L 67/04; H04L 67/10; H04L 67/1004; H04L 67/1044; H04L 67/1076;
(Continued)

(56) References Cited

U.S. PATENT DOCUMENTS 6,122,255 A * 9/2000 Bartholomew ....... H04M 3/367
370/352
7,031,288 B2   4/2006 Ogier
(Continued)

FOREIGN PATENT DOCUMENTS

| CN | 109076104 A | 12/2018 |
|---|---|---|
| DE | 102020201209 A1 | 10/2021 |
| WO | WO 2003/105499 A1 | 12/2003 |

OTHER PUBLICATIONS

PCT International Search Report and Written Opinion, PCT Application No. PCT/US2022/018025, dated Aug. 16, 2022, 19 pages.
(Continued)

*Primary Examiner* — Thuong Nguyen
(74) *Attorney, Agent, or Firm* — Fenwick & West LLP

(57) ABSTRACT

The nodes of a squad of nodes include a coordinating node and a set of worker nodes for sharing computational resources to perform resource intensive tasks. A requesting worker node may send work requests to the coordinating node of a squad of nodes. In response to a work request, the requesting worker node receives from the coordinating node a list of worker nodes to assign one or more tasks associated with the work request. The list of worker nodes is selected based on a report of resources and current utilization of each node within the squad. Upon receiving the list of workers, the requesting worker node divides the tasks associated with the work request into multiple buckets, assigns each bucket to a worker node form the list of worker nodes, and sends a request to process tasks from each of the buckets to the corresponding worker node.

21 Claims, 9 Drawing Sheets

(51) Int. Cl.
*G06F 9/50* (2006.01)
*H04L 67/04* (2022.01)
*H04L 67/10* (2022.01)
*H04L 67/1004* (2022.01)
*H04L 67/104* (2022.01)
*H04L 67/1074* (2022.01)
*H04L 67/1095* (2022.01)
*H04L 67/14* (2022.01)
*H04L 67/60* (2022.01)

(52) U.S. Cl.
CPC .......... *G06F 9/5066* (2013.01); *G06F 9/5083* (2013.01); *H04L 67/10* (2013.01); *H04L 67/1004* (2013.01); *H04L 67/1044* (2013.01); *H04L 67/1076* (2013.01); *H04L 67/1095* (2013.01); *H04L 67/14* (2013.01); *H04L 67/60* (2022.05)

(58) Field of Classification Search
CPC ..... H04L 67/1095; H04L 67/14; H04L 67/60; H04L 67/12; G06F 9/4881; G06F 9/5027; G06F 9/5066; G06F 9/5083
USPC ........ 709/227, 238, 201, 240, 241; 370/254, 370/329; 455/562, 446, 414, 456
See application file for complete search history.

(56) References Cited

U.S. PATENT DOCUMENTS

| | | | |
|---|---|---|---|
| 7,835,301 B1* | 11/2010 | Maufer | H04W 24/02 370/254 |
| 7,869,413 B2 | 1/2011 | Zuniga | |
| 8,880,941 B1 | 11/2014 | Reiss et al. | |
| 9,875,448 B2 | 1/2018 | Shahraray et al. | |
| 10,098,081 B2 | 10/2018 | Kim et al. | |
| 10,298,715 B2 | 5/2019 | Aikoh et al. | |
| 10,419,293 B1 | 9/2019 | She et al. | |
| 10,848,200 B2 | 11/2020 | Alexander | |
| 11,436,054 B1 | 9/2022 | Tootaghaj et al. | |
| 11,683,774 B2 | 6/2023 | Oteri et al. | |
| 2004/0199804 A1* | 10/2004 | Rathunde | G06F 11/0712 714/E11.073 |
| 2005/0063419 A1 | 3/2005 | Schrader et al. | |
| 2005/0094574 A1* | 5/2005 | Han | H04L 9/40 370/254 |
| 2009/0059799 A1* | 3/2009 | Friskney | H04L 41/0681 370/241.1 |
| 2009/0161578 A1 | 6/2009 | Yeung et al. | |
| 2009/0232034 A1 | 9/2009 | Li et al. | |
| 2010/0061292 A1* | 3/2010 | Weinstein | H04W 4/12 370/328 |
| 2012/0044864 A1 | 2/2012 | Zhang et al. | |
| 2012/0254280 A1 | 10/2012 | Parker | |
| 2013/0016727 A1* | 1/2013 | Tazzari | H04L 69/324 370/400 |
| 2013/0094536 A1 | 4/2013 | Hui et al. | |
| 2014/0047341 A1 | 2/2014 | Breternitz et al. | |
| 2014/0269637 A1* | 9/2014 | Banister | H04W 76/27 370/336 |
| 2015/0256435 A1 | 9/2015 | Sum et al. | |
| 2016/0182298 A1* | 6/2016 | Brooks | G06F 16/2379 709/206 |
| 2017/0127369 A1 | 5/2017 | Liu et al. | |
| 2017/0127464 A1 | 5/2017 | Liu et al. | |
| 2017/0201866 A1 | 7/2017 | Liu et al. | |
| 2017/0303187 A1 | 10/2017 | Crouthamel et al. | |
| 2018/0213580 A1* | 7/2018 | Taskin | H04W 88/16 |
| 2018/0287904 A1* | 10/2018 | Brummel | H04L 67/10 |
| 2018/0332547 A1 | 11/2018 | Liu et al. | |
| 2018/0359778 A1* | 12/2018 | Splitz | H04L 67/62 |
| 2020/0117513 A1 | 4/2020 | Li et al. | |
| 2021/0084566 A1* | 3/2021 | Kuenzi | H04W 40/246 |
| 2022/0141635 A1* | 5/2022 | Menon | H04W 4/90 455/404.1 |
| 2022/0164240 A1 | 5/2022 | Kim et al. | |
| 2023/0231910 A1 | 7/2023 | Barker et al. | |

OTHER PUBLICATIONS

PCT Invitation to Pay Additional Fees, PCT Application No. PCT/US2022/018025, dated Jun. 16, 2022, two pages.

United States Office Action, U.S. Appl. No. 17/681,590, dated Aug. 18, 2022, 12 pages.

United States Office Action, U.S. Appl. No. 17/681,598, Sep. 9, 2024, 28 pages.

* cited by examiner

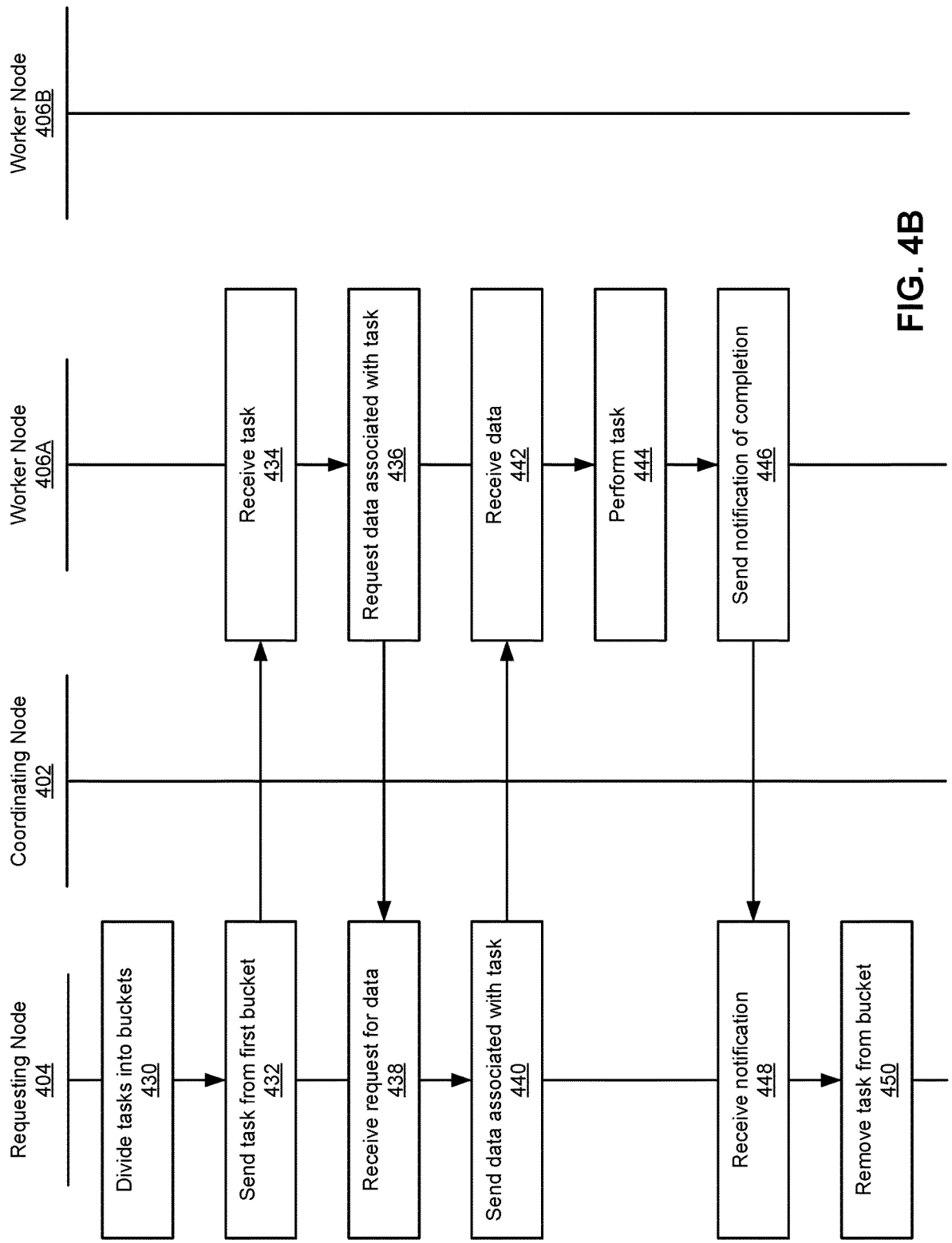

COMMUNICATION MANAGEMENT BETWEEN MESH-NETWORKED MOBILE NODES

CROSS REFERENCE TO RELATED APPLICATIONS

This application claims the benefit of U.S. Provisional Application No. 63/154,516, filed Feb. 26, 2021, and U.S. Provisional Application No. 63/299,828, filed Jan. 14, 2022, both of which are incorporated by reference in their entirety.

This application relates to U.S. patent application Ser. No. 17/681,590, titled "Discoverability and Resource Management of Mesh-Networked Mobile Nodes," filed Feb. 25, 2022, and U.S. patent application Ser. No. 17/681,598, titled "Resource-Sharing Mesh-Networked Mobile Nodes," filed Feb. 25, 2022, both of which are incorporated by reference in their entirety.

BACKGROUND

Body worn computers may be used in the field to increase the perception by a user of the environment surrounding the user of the body worn computer. For example, body worn computers may be connected to cameras, microphones, or other sensors capturing data of the environment surrounding the body worn computer. The body worn computer may then analyze the data streams coming from those sensors and may alert the user if something relevant is detected. However, to increase the portability of body worn computers, and to reduce the impact of the body worn computer on the mobility of the user wearing the body worn computer, body worn computers may have limited computational power compared to stationary computing devices (such as desktop computers or servers). This limits communication capabilities between devices that may be locally connected, e.g., real time big data transfers. Moreover, to be portable, body worn computers may run on batteries, further limiting the capabilities of the body worn computer. For example, locally connected devices may have limited range for data communication as well as processing of data between devices.

SUMMARY

Embodiments relate to resource-sharing mesh-networked mobile nodes (e.g., on-body computing devices). The mobile nodes are connected to each other through a mesh network and are capable for sharing computational resources to execute tasks originating from within the mesh network. Each mobile node may be a node within a squad of nodes and is able to communicate with other nodes to send requests for performing one or more resource intensive tasks, or to receive requests from other nodes for performing one or more resource intensive tasks.

In some embodiments, the mobile nodes communicate with each other by sending event messages corresponding to events detected by a node within the mesh network. In some embodiments, the event messages may include a timestamp and a list of nodes that have previously received the event message. A listening node may listen to such event messages and may perform a series of actions upon receiving an event message from a sending node connected to the listening node through the mesh network. For example, upon receiving an event message, the listening node may record the event associated with the event message in an event database. Moreover, the listening node may identify nodes that are directly connected to the listening node and that are not included in the list of nodes that have previously received the event message to forward the event message to. In addition, the listening node may send the event message to an application being executed in the mobile node corresponding to the listening node.

In some embodiments, the nodes of a squad of nodes connected to each other through a mesh network include a coordinating node and a set of worker nodes for sharing computational resources to perform resource intensive tasks. To coordinate the sharing of computational resources, a coordinating node may request a report of resources status and current utilization from each worker node connected to the mesh network. In some embodiments, the report of resource status includes at least a battery level of a corresponding worker node. A battery level may be, for example, an amount of battery power (or energy) available. The battery power may take into account percentage of a full charge and/or may also include absolute energy levels available (e.g., 70% of a 30000 mAH battery may mean more available energy than 80% of a 20000 mAH battery). The coordinating node may receive a work request from a requesting worker node. The coordinating node identifies a subset of worker nodes for executing the work request based on at least the battery level of each worker node and the current utilization of each worker node. The coordinating node then sends the list of identified worker nodes to the requesting worker node to allow the requesting worker node to divide the tasks for completing the work request among the worker nodes included in the list of identified worker nodes.

In some embodiments, a requesting worker node sends a work request to a coordinating node of a squad of nodes. The requesting worker node receives from the coordinating node a list of worker nodes to assign one or more tasks associated with the work request. The list of worker nodes may include a subset of nodes of the squad identified based on a report of resources and current utilization of each node within the squad. Upon receiving the list of workers, the requesting worker node divides the one or more tasks associated with the work request into one or more buckets, assigns each bucket to a worker node form the list of worker nodes, and sends a request to process tasks from each of the buckets to the corresponding worker node.

BRIEF DESCRIPTION OF THE DRAWINGS

FIGS. 4A and 4B illustrate a process for sharing computational power among mobile nodes of a squad, according to one or more embodiments.

Figure 1:
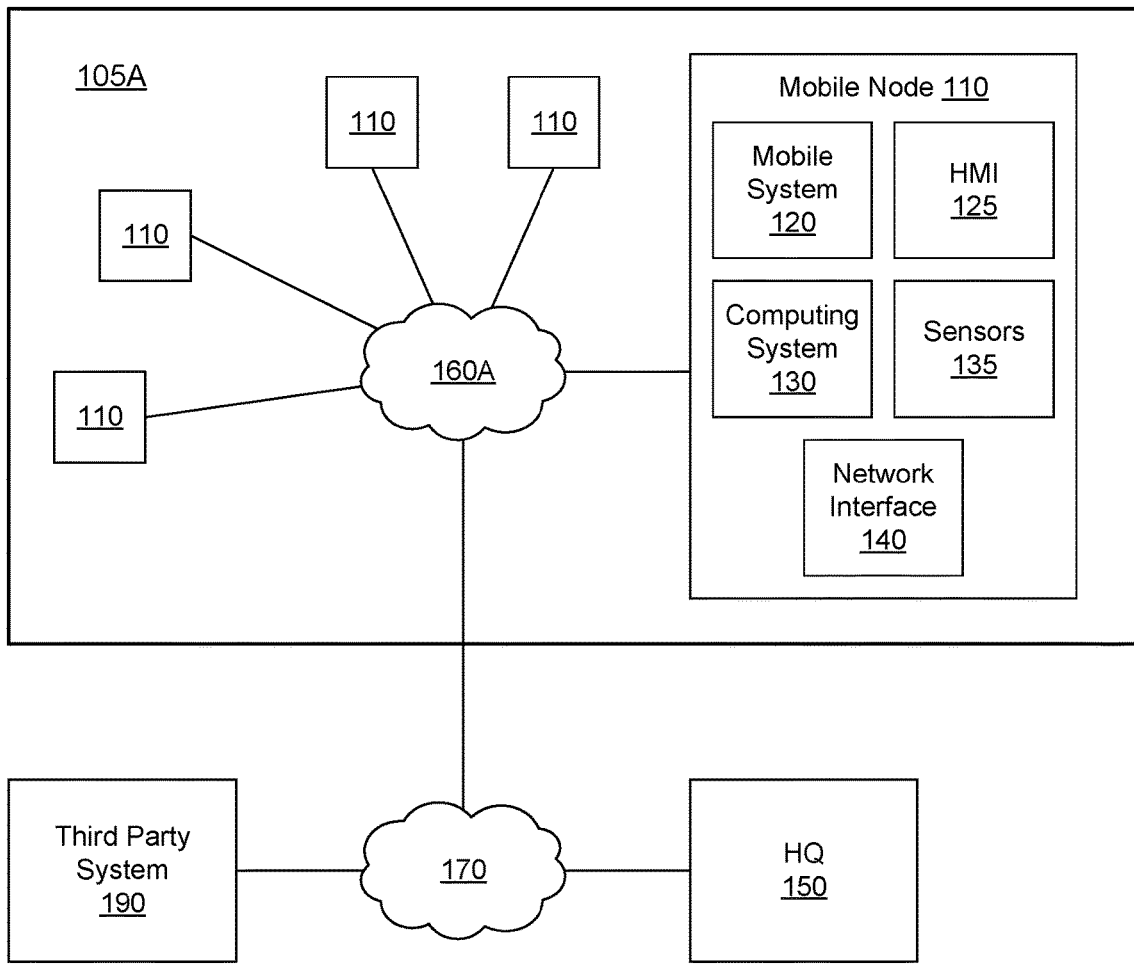
FIG. 1 is a block diagram of a system environment for a squad of mobile nodes, according to one or more embodiments.
Figure 1:
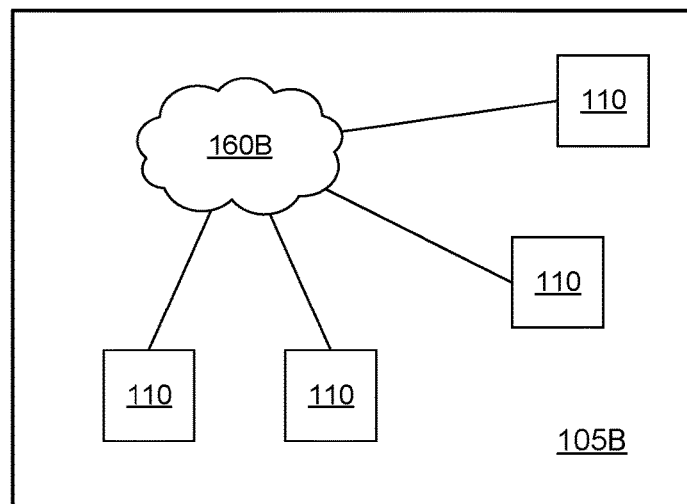

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Mobile nodes (such as on-body computing devices) may be wearable computing devices that provide automatic and persistent perception capabilities to the wearer. In another example, mobile nodes may be a remote controller or autonomous machine (such as a drone). Moreover, mobile nodes may become nodes in a network of mobile nodes forming a squad. The mobile node may also handle communication, data update, and network resilience amongst the computing devices of the squad.

The capabilities of on-body computing devices may provide the wearer with perception capabilities that would not be feasible for the wearer to perform on their own. For example, the on-body computing device may provide facial recognition capabilities to match the appearance of persons in the vicinity of the wearer against a database of persons of interest. Moreover, the on-body computing device may provide information about identified persons of interest that may aid the wearer on how to handle an interaction with the person of interest. In another example, the on-body computing device may provide enhanced perception capabilities, such as providing perception capabilities across all directions (e.g., front, back, and sides) of the wearer, in addition to providing perception capabilities across an expanded field by crowdsourcing the analysis of the expanded field across multiple mobile nodes of a squad.

On-body computing devices may be worn by members of a team traversing across a geographical area (e.g., a geographically bounded area) or a field. For example, on-body computing devices may be worn by members of a search team searching for a person across a geographical area. The on-body computing devices may provide enhanced perception capabilities and enhanced communication capabilities to the members of the search team to be able to find the target more easily. In another example, on-body computing devices may be worn by soldiers of a squad to provide enhanced perception capabilities and enhanced communication capabilities to obtain information about the state of the battlefield.

In one embodiment, the mobile node includes a set of sensors for enhancing the perception of the wearer. For example, the mobile node includes one or more cameras for capturing images or videos of the surroundings of the mobile node, and an array of microphones for capturing audio of the surroundings of the mobile node. Moreover, the mobile node may include additional sensors such as temperature sensors, proximity sensors, light sensors, gas sensors, etc. The data captured by the sensors may then be analyzed by one or more classification models (e.g., image classification models such as a person of interest detection model or a weapon detection model) run by the mobile node. Furthermore, the output of the classification model may be displayed to the wearer of the mobile node (e.g., though a head mounted display), and/or may be provided to other mobile nodes of the squad.

In one embodiment, the mobile node includes a set of network adapters for establishing a mesh network to communicate with other members of the squad. For example, the mobile node may include a first network adapter that is configured to act as an access point that accepts connections from other members of the squad. The mobile node may include a second network adapter that is configured to search for access points corresponding to other members of the squad and is configured to connect to one or more access points.

In one embodiment, the mobile nodes are configured to communicate among themselves to distribute the workload of executing resource intensive tasks. Specifically, the computational capabilities of wearable devices are typically limited to improve the portability or wearability of the device. For example, the size of a battery used to power the wearable device is typically limited so as to not significantly impair the mobility of the wearer, and the computational power of the wearable device is typically limited to improve the battery life of the device. By spreading the workload of resource intensive tasks across multiple mobile nodes, the completion of the resource intensive task may be accelerated.

System Architecture

FIG. 1 is a block diagram of a system environment 100 for a squad 105 of mobile nodes 110, according to one or more example embodiments. The system environment 100 shown by FIG. 1 comprises one or more squads 105, a headquarter (HQ) node 150, and a cloud network 170. In some embodiments, the system environment 100 additionally includes one or more third-party systems 190. In alternative configurations, different and/or additional components may be included in the system environment 100.

The squad 105 comprises one or more mobile nodes 110 that are communicatively coupled with each other through a mesh network 160. For instance, the diagram illustrated in FIG. 1 includes two squads 105A and 105B. The first squad 105A includes a first set of mobile nodes 110 connected to each other through a first mesh network 160A. The second quad 105B includes a second set of mobile nodes 110 connected to each other through a second mesh network 160B.

The mobile nodes 110 are computing devices capable of receiving user input as well as transmitting and/or receiving data via the mesh network 160 or the cloud network 170. In one embodiment, a mobile node 110 is an on-body node or a wearable node. An on-body node or a wearable node is a computer system implemented in an enclosure that can be worn by a person. Alternatively, an on-body node 110 may be a device having computer functionality, such as a personal digital assistant (PDA), a mobile telephone, a smartphone, or another suitable device that is portable and can be carried by a person. In yet other embodiments, a mobile node 110 is a computing device embedded or attached to remote controlled or autonomous machines (such as drones).

A mobile node 110 is configured to communicate with other mobile nodes within the squad 105 via the mesh network 160. The mesh network may be created by establishing node to node connections between two or more nodes of the squad. In some embodiments, a mobile node 110 is able to communicate with other nodes that are connected to the mesh network 160 but not directly connected to the mobile node via an intermediary node or a chain of intermediary nodes. Moreover, a mobile node 110 may be configured to communicate (e.g., to devices outside of the squad 105) via the cloud network 170. In some embodiments, the mobile nodes 110 of a squad is able to connect to the cloud network 170 as long as at least one node has a connection to both the cloud network 170 and the mesh network 160 of the squad. In some embodiments, a squad may not have a connection to the cloud network 170. For instance, the second squad 105B of FIG. 1 has a set of mobile nodes 110 that are connected to each other but that do not have a connection to the cloud network 170. In this example, none of the nodes of the squad 105B may be within range of an access point for connecting to the cloud network 170.

In some embodiments, a squad 105 having a set of mobile nodes 110 connected through a mesh network 160 may split forming two squads. That is, a first subset of nodes of the squad 105 may get disconnected from a second subset of nodes of the squad 105. In this scenario, the first subset of nodes may form a first mesh network to communicate with each other, and the second subset of nodes may form a second mesh network to communicate with each other. However, since none of the nodes of the first subset of nodes are able to connect to a node of the second subset of nodes, and none of the nodes of the second subset of nodes are able to connect to a node of the first subset of nodes, communication between nodes in the first subset of nodes and the second subset of nodes may be interrupted. However, if a node from the first subset of nodes becomes within range of a node from the second subset of nodes, the first mesh network connecting the nodes form the first subset of nodes may merge with the second mesh network connecting the nodes form the second subset of nodes, reenabling communication between nodes in the first subset of nodes and the second subset of nodes.

In one embodiment, the mobile node 110 executes an application for presenting information to a user of the mobile node 110. Additionally, a mobile node 110 may execute an application allowing a user of the mobile node 110 to interact with the other mobile nodes 110, the HQ node 150, or the one or more third-party systems 190. For example, a mobile node 110 executes classification models to present information corresponding to the environment surrounding the user of the mobile node 110. In another example, the mobile node 110 receives executes a communication application for receiving or sending information from other mobile nodes 110 corresponding to the environment surrounding to users of the other mobile nodes 110, or executes a work-sharing application for sharing computational power with other mobile nodes 110 for analyzing the environment surrounding the mobile node 110 or the environment surrounding the other mobile nodes 110.

Each mobile node 110 includes a mobile system 120, a human-machine interface (HMI) 125, one or more computing system 130, a set of sensors 135, and one or more network interfaces 140. In other embodiments, the mobile system 120 may include additional, fewer, or different components for various applications.

The mobile system 120 manages the communication and collaboration between the mobile nodes 110 of the squad 105. For example, the mobile system 120 of a mobile node 110 operates in conjunction with mobile systems 120 of other mobile nodes 110 within the squad 105 to establish a mesh network for communicating with each other. Moreover, the mobile system 120 of a mobile node 110 operates in conjunction with mobile systems 120 of other mobile nodes 110 to share computational resources to perform processing intensive tasks. Moreover, the mobile system 120 of a mobile node 110 may communicate with other components of the mobile node 110 to provide notifications to the user of the mobile node 110. A more detailed description of the mobile system 120 is provided below in conjunction with FIG. 2.

The HMI 125 includes input and output devices. The HMI 125 is configured to receive information from the mobile system 110 of the mobile node 110 or the computing system 130, and control and output device for presenting the received information or otherwise providing a stimulus based on the received information to the user of the mobile node 110. For example, the HMI includes a display for presenting a graphical user interface (GUI) to the user of the mobile node 110. The display may be a head-mounted display (HMD) such as a helmet with an eye shield. Alternatively, the display may be a display device embedded in the computing system 130 (e.g., a display of a smartphone). In some embodiments, the HMI includes multiple displays for presenting different pieces of information to the user of the mobile node 110. The GUI may be configured to present visual notifications to the user of the mobile node 110. In some embodiments, the GUI for displaying information to the user of the mobile node 110 is generated or rendered by the computing system 130, or a separate processor embedded in the HMI 125. In some embodiments, the HMI includes other output devices such as speakers or headphones for providing audible cues or notification (e.g., beeps, buzzes, etc.), haptic devices for providing haptic cues (e.g., vibrations), light sources (such as strobe lights), heat sources, etc.

Moreover, the HMI 125 is configured to receive inputs from a user of the mobile node 110 and provide signals to the mobile system 110 of the mobile node 110 or the computing system 130 of the mobile node 110 for processing. For example, the HMI includes a microphone (e.g., for receiving voice inputs), a camera (e.g., for receiving gesture inputs), one or more buttons (e.g., as part of a keyboard and/or keypad), a touch screen, a pointing device, accelerometers, etc. In some embodiments one or more input devices of the HMI are embedded devices of the computing system (e.g., a microphone and touch screen of a mobile smartphone).

The computing system 130 is configured to perform computational tasks, e.g., communications, data processing, or tracking. In some embodiments, the computing system 130 receives a set of inputs (such as video input recorded by a camera or audio input recorded by a microphone) and processes the inputs based on predefined tasks. Moreover, the computing system 130 may perform additional tasks as requested by the operator of the mobile node 110, or as requested by other mobile nodes 110 or the HQ node 150 communicating through the network. In some embodiments, the computing system 130 includes a mobile smartphone or other mobile computing devices. An example of a computing system 130 that can be used in a mobile node 110 is provided below in conjunction with FIG. 6.

The sensors 125 are configured to capture data of the surroundings of the mobile node 110. For example, the mobile node 110 may include one or more (e.g., an array) cameras for capturing images or videos of the surroundings of the mobile node 110. The images or videos captured by the one or more cameras may be sent to classification models being run by the computing system 130 to identify conditions of the surroundings of the mobile node, including the recognition of object and individuals in the vicinity of the mobile node. Moreover, the mobile node 110 may include one or more (e.g., an array) microphones for capturing audio of the surroundings of the mobile node. The audio being captured by the array of microphones may be sent (e.g., transmitted) to classification models to identify conditions of the surroundings of the mobile node, including the triangulation of specific audio cues (e.g., explosions or gunshots) to identify the direction or location the audio cues originated from. In some embodiments, the sensors 125 include additional sensors, e.g., temperature sensors, pressure sensors, proximity sensors, light sensors, and/or gas sensors.

In some embodiments, one or more (e.g., an array) sensors 135 are connected to the computing system 130 and provide the data captured by the sensors to the computing system 130. Alternatively, one or more sensors 135 may be connected to other components of the mobile node 110 through the network interface 140. For example, the sensors may have a wireless network adapter and my register with the network interface 140 during a boot (e.g., system startup) process. Each sensor may have a specific address or port number and other components of the mobile node 110 (and optionally other mobile nodes of the squad) are able to request data from each of the sensors by sending requests to the address or port number assigned to the corresponding sensor.

The network interface 140 is configured to receive and transmit information from network interfaces of other mobile nodes 110 and the HQ node 150. In some embodiments, the network interface 140 is configured to receive information (such as data packets) from other components of the mobile node 110 (such as the mobile system 120 or the computing system 130) and emit electromagnetic signals generated based on the received information. Moreover, the network interface 140 is configured to capture electromagnetic signals emitted by a network interface of another mobile node 110 and generate signals to provide to other components of the mobile node 110 (such as the mobile system 120 or the computing system 130) for processing. In some embodiments, the network interface 140 includes one or more (e.g., an array) antennas to transmit and receive electromagnetic signals (wireless signals). Moreover, each mobile node 110 may include multiple network interfaces 140. For example, each node may have a primary network interface for connecting to a primary network, and a secondary network interface for connecting to a secondary network to be used if the primary network becomes unavailable.

The HQ node 150 may be a node from where the operation of the squad 105 is controlled. For example, the HQ node 150 may provide instructions to each member of the squad 105 or to the squad as a whole to execute a mission in the field. In some embodiments, the HQ node 150 is a stationary or semi-stationary node. For example, the HQ node may be installed in a building that operates as a command center for the operations of the squad. Alternatively, the HQ node may operate from a vehicle, such as a High Mobility Multipurpose Wheeled Vehicle (HMMWV or Humvee). In some embodiments, the HQ node 150 has a higher computational capability than each of the mobile nodes 110.

The mobile nodes 110 and the HQ node 150 are configured to communicate via the cloud network 170, which may comprise any combination of local area and/or wide area networks, using both wired and/or wireless communication systems. For example, the network 170 may communicatively couple two or more squads 105, and their respective nodes 110, within a local area network and further communicatively couple with HQ 150 and/or third-party system 190, within a wide area network. In one embodiment, the cloud network 170 uses various communications technologies and/or protocols. For example, the cloud network 170 includes communication links using technologies such as Ethernet, 802.11, worldwide interoperability for microwave access (WiMAX), generational cellular data networks (e.g., 3G, 4G, 5G, 6G, etc.), code division multiple access (CDMA), digital subscriber line (DSL), etc. Examples of networking protocols used for communicating via the cloud network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the cloud network 170 may be represented using any suitable format, such as hypertext markup language (HTML) or extensible markup language (XML). In some embodiments, all or some of the communication links of the cloud network 170 may be encrypted using any suitable technique or techniques. Further, the cloud network 170 may be a private network and may be configured to include additional security protocols, including authentication mechanisms and/or encryption mechanisms.

One or more third party systems 190 may be coupled to the cloud network 170 for communicating with the mobile nodes 110 or the HQ node 150. In one embodiment, a third party system 190 is an application provider communicating information describing applications for execution by the mobile nodes 110 or the HQ node 150, or communicating data to the mobile nodes 110 or the HQ node 150 for use by an application executing on the mobile nodes 110 or the HQ node 150. In other embodiments, a third-party system 190 provides content or other information for presentation via a mobile node 110.

Figure 2:
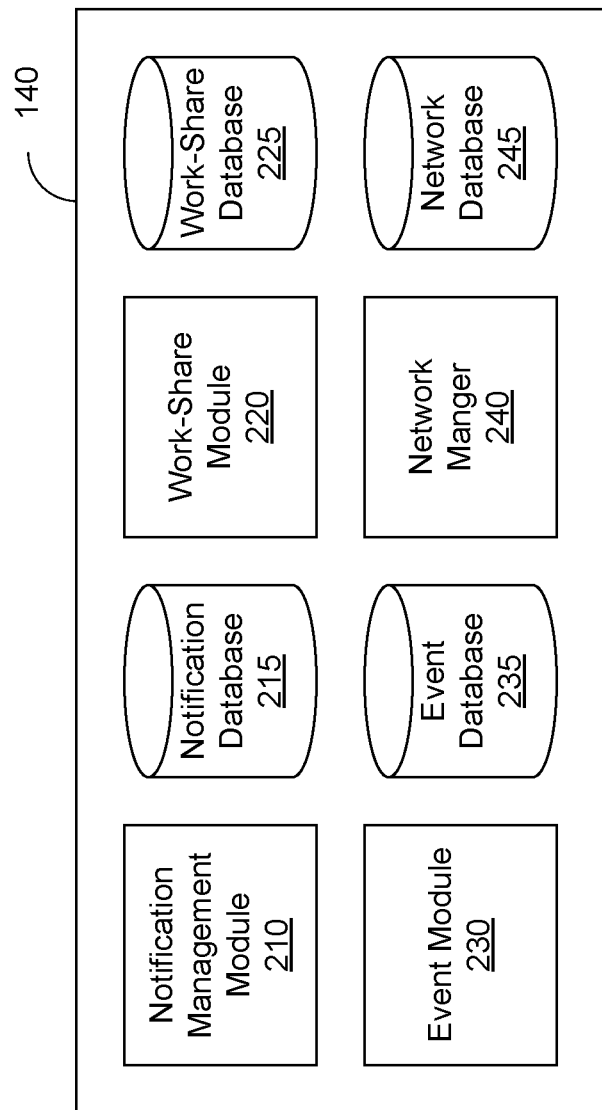
FIG. 2 is a block diagram of an architecture of the on-body system, according to one or more embodiments.

Turning now to FIG. 2, illustrated is a block diagram of an architecture of the mobile system 120, according to one or more example embodiments. The mobile system 120 includes a notification management module 210, a notification database 215, a work-share module 220, a work-share module database 225, and event module 230, an event database 235, a network manager 240, and a network database 245. In other embodiments, the mobile system 120 may include additional, fewer, or different components for various applications. It is noted that the reference to modules is for ease of discussion. Modules may be hardware-based modules (e.g., processor (e.g., processors, controllers, state machines) based system configured to execute the functionality described), software-based modules (e.g., software components structured as computer program code comprised of instructions storable on a non-transitory computer readable storage medium) and executable by a processor, or a combination thereof (e.g., firmware configured as coded program code within a hardware component having a processor).

The notification management module 210 is configured to receive event messages, process the event messages, and determine the number and method of communication channels to be used for rendering the events to the HMI. In some embodiments, the notification management module 210, includes hard-coded or program-determined notification paths. Moreover, the notification management module 210 may allow for custom notification paths (e.g., through an if-this-then-that user interface and programming paradigm). The notification management module 210, may track events that have been acknowledged and the events that have been already seen, and outputs the events to the appropriate channels of the HMI. In some embodiments, the notification management module 210 has the options of forwarding un-acknowledged events to other members of the squad in an escalation scheme.

In some embodiments, the notification management module 210 maintains the notification database 215. The notification database may store a set of notifications that have been provided to the user of the mobile node 110. Moreover, the notification store may include an indication whether each of the notifications have been acknowledged by the user of the mobile node 110. In some embodiments, the notifications are stored as a time-series (e.g., organized by timestamp). Moreover, for each notification, the notification database may store information about the source of the notification. For example, if a notification is provided to a user of a mobile node 110 in response to an event detected by another node, the notification database stores information about the node that triggered the notification, the equipment that captured the data that triggered the notification, the location of the node that triggered the notification when the notification was triggered, etc.

The work-share module 220 allows for the shared utilization of a central processing unit (CPU), graphical processing unit (GPU), memory, battery, and other limited computational systems across the mobile nodes 110 connected through the mesh network 160 (or optionally through the cloud network 170). For example, the work-share module 220 enables computer processing tasks to be spread across the multiple mobile nodes 110. The work-share module 220 may receive as inputs task request for processing image streams, audio streams, and other signal data (e.g., radio, infra-red, data-feeds, etc.).

By way of example, machine learning and computer perception models or algorithms can be applied to image streams or audio streams. These models or algorithms may be resource intensive and time consuming. To alleviate the constrain of these resource intensive and time consuming tasks on mobile nodes with limited capabilities, tasks are shared across this multiple mobile nodes. The work-share module 220 coordinates the execution of these tasks across multiple mobile nodes connected to each other via the mesh network 160 (e.g., by passing messages through the event module 230). The work-share module 220 may also handle tracking utilization of on-board resources, and querying and recording the resource utilization across the mobile nodes 110 of the squad 105. In some embodiments, the output of the work-share module 220 is a stream of events representing the detection and perception results from the machine learning and computer perception models or algorithms on the input data streams, and events that represent requests for data off-load to other mobile nodes within the squad.

In some embodiments, the work-share module 220 maintains a work-share database 225. The work-share database may store information about current tasks that are being distributed across multiple mobile nodes. For example, the work-share database may store a list of tasks and an identification of a node that has been assigned to execute each of the tasks. In addition, the work-share database stores a status of each of the tasks (e.g., unassigned, not started, being executed, completed, failed, etc.). For each task, the work-share database may additionally store data (e.g., one or more images or one or more sensor data snippets) associated with the task. In some embodiments, the work-share database 225 additionally includes information about past tasks that were distributed across multiple mobile nodes.

The event module 230 is configured to manage events and event messages between the mobile nodes 110 of a squad 105. For example, the event module 230 is configured to receive event messages from other mobile nodes 110 of the squad 105 and perform one or more actions based on the contents of the received event message. Moreover, the event module 230 may be configured to forward event messages to other mobile nodes 110 connected to the mesh network 160.

In some embodiments, events associated with event messages correspond to interactions by a user of a mobile node 110 through the HMI 125 of the mobile node 110, outputs of the work-share module 220, changes detected by the network manager 240, outputs from the computing system 130, and the like.

In some embodiments, the event module 230 is configured to track a history of an event. For example, the event module 230 may keep track of whether actions for addressing the event have been performed by mobile nodes of a squad. Moreover, the event module 230 is configured to de-duplicate and/or merge event messages corresponding to the same event.

In some embodiments, the event module 230 maintains an event database 235. Upon receiving a new event message from other mobile nodes 110 of the squad 105, the event module 230 may create a new entry in the event database to store and index the event associated with the received event message. Moreover, the event module 230 may create a new entry in the event module 230 to store events generated by the mobile node 110.

The network manager 240 is configured to manage the connection between a mobile node 110 and other mobile nodes that are connected to the mesh network 160. Moreover, the network manager 240 may be configured to manage the connection between mobile nodes 110 and other nodes (such as the HQ node 150 or a third-party system 190) connected to the cloud network 170.

In some embodiments, the network manager 240 is configured to monitor the connections between a mobile node 110 and other entities (such as other mobile nodes, the HQ node, or third-party systems) connected to the network. The network manager 240 may keep track of the signal strength and network paths between the mobile node 110 and other entities connected to the mobile node through the mesh network 160.

In some embodiments, the network manager 240 maintains the network database 245. The network database 245 may store information about connections between the mobile node 110 and other entities connected to the mobile node 110 through the mesh network 160. For example, the network database 245 stores a list of nodes connected to the mesh network 160, a signal strength between the mobile node and other nodes connected to the mobile node through the mesh network 160, a network path for sending or receiving messages from each of the nodes connected to the mobile node 110 through the mesh network, and the like.

Event Management

As used herein, an event is a piece of knowledge or information that should be shared among all nodes of a squad 105. In systems having a fixed coordinating node and worker nodes that are connected to a reliable network (e.g., where the nodes rarely disconnect from the network), resources can be scaled, and processing can be ordered and organized without concerns of nodes becoming suddenly unavailable. However, in systems having an unreliable node (e.g., as a system where the nodes are mobile such as with mobile nodes 110 that are part of a squad 105 (e.g., a military squad)) such reliability of the network, (e.g., the mesh network 160 or the cloud network 170), and the nodes, (e.g., nodes 110), cannot be taken as granted. For example, the coordinating node may be damaged in the field or may travel outside of the radius of network coverage, causing the coordinating node to disconnect from the network (e.g., a mesh network or a cloud network connecting multiple nodes to each other). When the coordinating node disconnects from the network, the nodes relying on the coordinating node may experience interruptions in the services being consumed by the nodes. Similarly, the connectivity of the other nodes to the network may be faulty and dynamic, causing certain resources that could be available to be lost. As such, the availability of those resources may be sporadic, unstable, or limited in bandwidth.

For example, as mobile nodes 110 move around a geographical area, a mobile node 110 may move outside of the range of the mesh network 160 connecting the squad 105 of mobile nodes 110. As users wearing the mobile nodes 110 move, the connectivity status of each of the mobile nodes 110 within the mesh network 160 may constantly change. As such, the mobile node 110 that moved outside of the range of the mesh network 160 may stop receiving notification generated by the other mobile nodes connected to the mesh network 160. Additionally, the other mobile nodes that are connected to the mesh network 160 become unavailable to receive notification that are generated by the mobile node that disconnected from the mesh network 160.

Figure 3A:
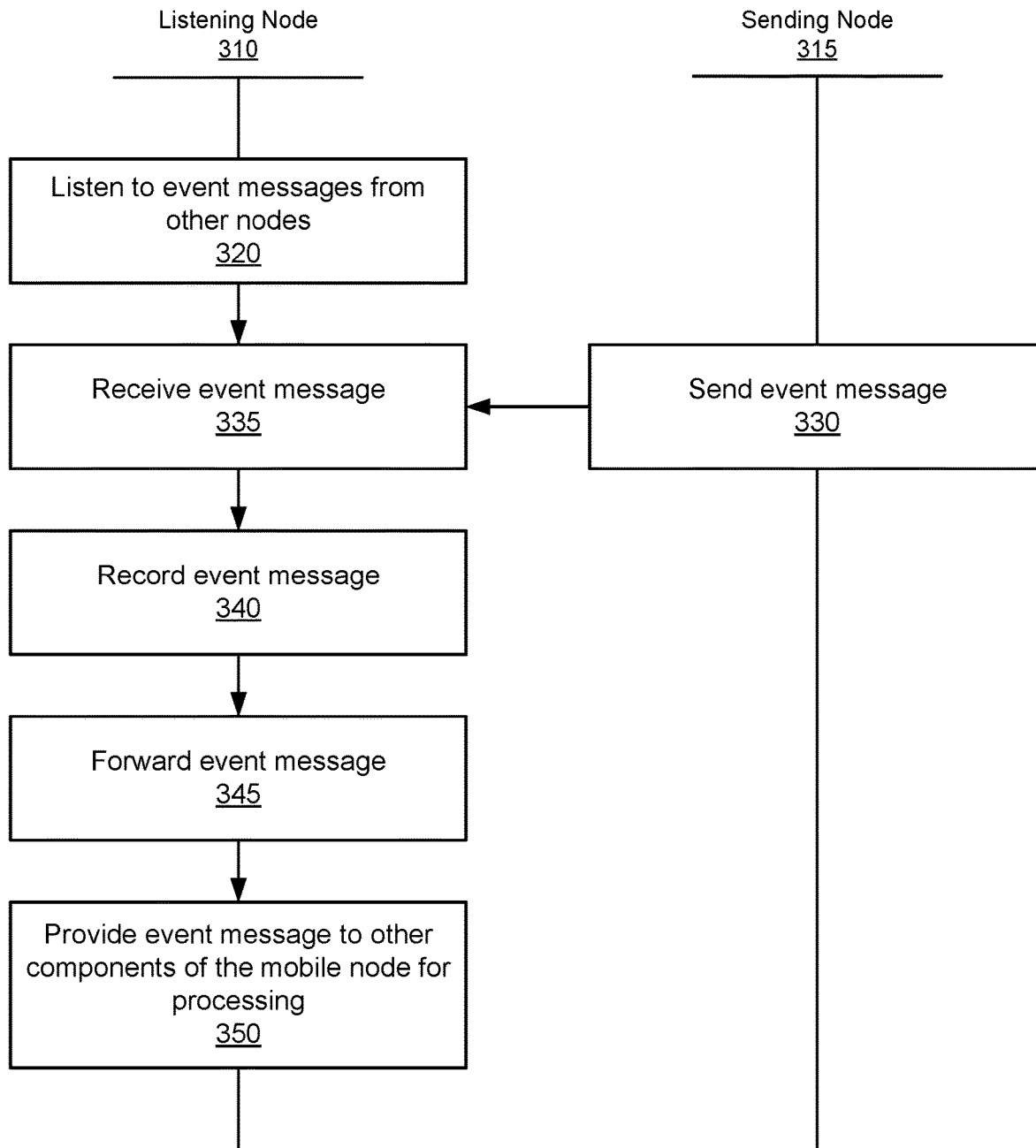
FIG. 3A illustrates a flow diagram for processing event messages by a listening node of a squad, according to one or more embodiments.

FIG. 3A illustrates a flow diagram for processing event messages by a listening node 310 of a squad 105, according to one or more embodiments. The event module 230 of a listening node 310 (such as a mobile node 110 of a squad 105) listens 320 for event messages transmitted by other mobile nodes 110. In some embodiments, the event messages a broadcasted by a sending node 315 and other mobile nodes 110 that are within a wireless coverage of the sending node 315 are able to receive the broadcasted event message. In other embodiments, a listening node 310 registers with other mobile nodes 110 the listening node 310 is able to reach. When a sending node 315 has an event message to transmit, the sending node 315 retrieves a list of nodes that are listening to the sending node 315 and sends messages to each of the nodes that are listening to the sending node 315.

When the sending node 315 has a new event to communicate to other nodes, the sending node 315 generates a new event message and sends 330 the event message to a listening node 310. As described above, the event message may be sent to the listening node using a broadcasting scheme (multicast) or direct messages (unicast) between the sending node 315 and the listening node 310.

Once the listening node 310 receives 335 the event message, the event module 230 of the mobile system 120 of the listening node 310 records 340 the event in the event database 235. In some embodiments, the event module 230 of the mobile system 120 of the listening node 310 creates a new entry in the event database 235 and populates the new entry based on information included in the event message. In some embodiments, the information stored in a new entry of the event database 235 changes based on the type of event associated with the new entry. For example, for a "person detection" event, the event database may store an identity and location of a detected person of interest. In another example, for a "weapon detection" event, the event database may store information about the type of weapon, a model of the weapon, and a location where the weapon was detected.

Moreover, the event module 230 of the mobile system 120 of the listening node 310 forwards 345 the event message to other mobile nodes 110 that are within the range of the listening node 310. In some embodiments, the event message includes a list of nodes that have already received the event. The listening node 310 may compare a list of mobile nodes 110 that are connected to the listening node 310 or that are otherwise listening for messages transmitted by the listening node 310 to the list of nodes that have already received the event. If any mobile node 110 that is connected to the listening node 310 or that is listening to the listening node 310 is not included in the list of nodes that have already received the event, the listening node 310 forwards the event message to that mobile node 110. After the mobile node receives the event message forwarded by the listening node 310, the mobile node performs the steps shown in FIG. 3A. This process is performed by each of the mobile nodes 110 connected to the cloud network 160 until all of the mobile nodes 110 have received the event.

In addition, the event module 230 of the mobile system 120 of the listening node 310 provides 350 the event message (or portions of the event message) to other components of the mobile node for processing. For example, the event module 230 may provide the event message to the computing system 130 for processing. In some embodiments, the event module 230 identifies a type of event corresponding to the received event message and provides the information to a corresponding service run by the mobile node (e.g., a service run at the computing system 130 of the mobile node 110). In some embodiments, the event type is selected from a predefined list or registry of event types. The event module 230 may use an event-to-service mapping to identify or select a service to forward the information to. Alternatively, the event module 230 may analyze the contents of the event message, and may select a service to forward the information to based on the analysis of the event message.

In some embodiments, the listening node 310 may receive the same event message multiple times from different sending nodes. If the listening node 310 receives a duplicate event message, the listening node 310 may ignore the duplicate event message. Alternatively, if the listening node 310 receives a duplicate event message, the event module 230 of the listening node 310 may update the event database 235 accordingly.

In some embodiments, after a listening node 310 disconnects from the mesh network 160, the listening node 310 is unable to receive event messages from other mobile nodes 110 connected to the mesh network 160. At a later time, the listening node 310 may reconnect to the mesh network 160. Once the listening node 310 reconnects to the mesh network 160, the listening node 310 resynchronizes its event database. For example, the listening node 310 may request messages that were missed from other mobile nodes 110 connected to the mesh network 160.

Figure 3B:
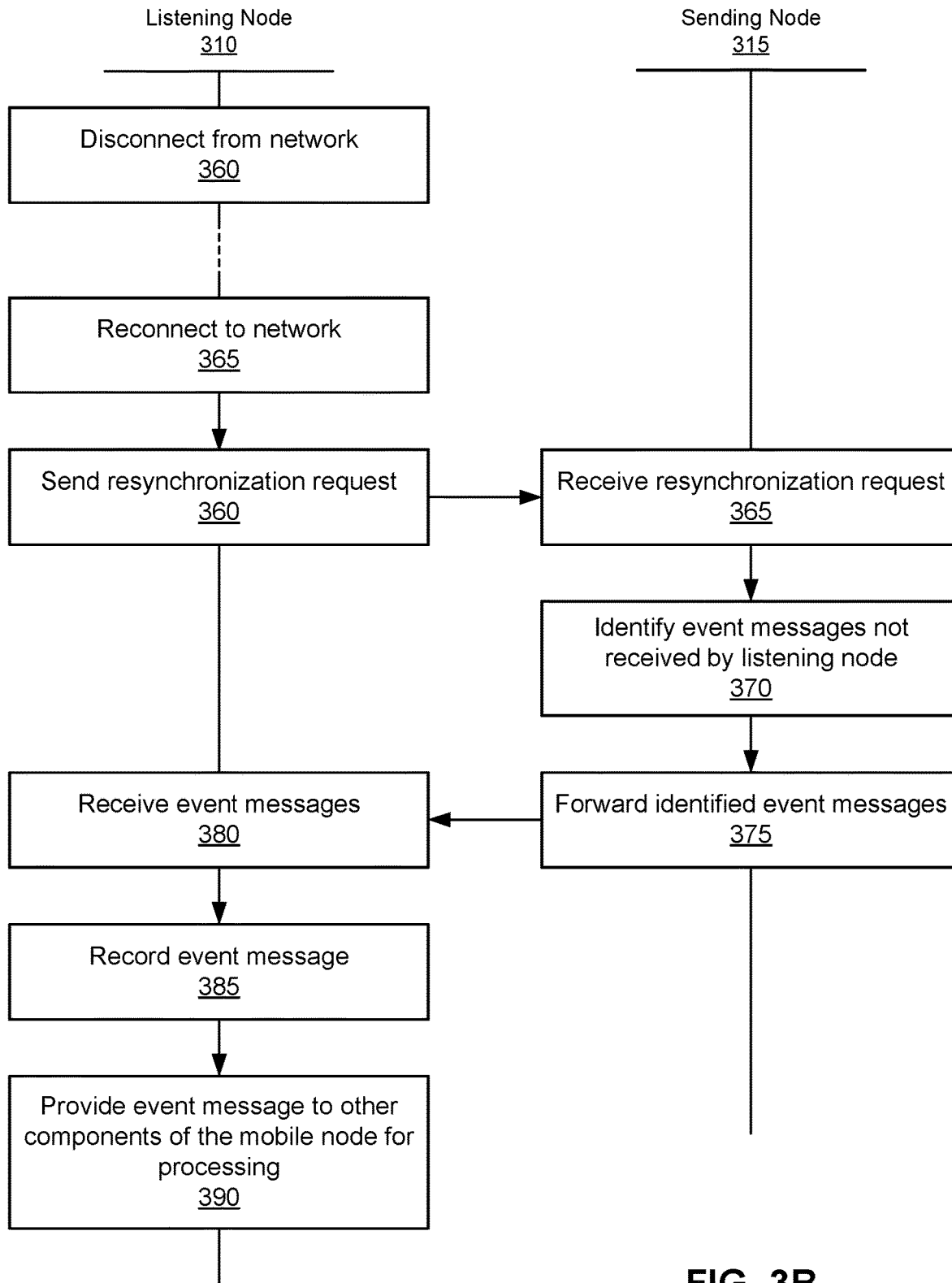
FIG. 3B illustrates a flow diagram for processing resynchronizing event messages by a listening node of a squad, according to one or more embodiments.

FIG. 3B illustrates a flow diagram for processing resynchronizing event messages by a listening node 310 of a squad 105, according to one or more embodiments. During operation of a listening mobile node 310, the listening node disconnects 360 from the mesh network 160. For example, the listening node 360 may go outside of the range of the other mobile nodes 110 connected to the mesh network 160. Moreover, in some embodiments, the mobile nodes 110 may split into two or more mesh networks. That is, a first subset of mobile nodes 110 may form a first mesh network 160A, e.g., a first squad 105A, and a second subset of mobile nodes 110 may form a second mesh network 160B, e.g., a second squad 105B. The first subset of mobile nodes 110, e.g., the first squad 105A, may be outside of the range of the second subset of mobile nodes 110, e.g., the second squad 105B, but within range of each other; and the second subset of mobile nodes 110 may be outside of the range of the first subset of mobile nodes 110, but within range of each other.

After some amount of time, the listening node 310 may reconnect 365 to the mesh network 160. Alternatively, in the scenario where the mesh network split into two or more mesh networks, the two or more mesh networks may merge into a single mesh network. While the listening node 310 was disconnected from the mesh network, the listening node 310 was unable to receive event messages from the other mobile nodes 110 (such as the sending node 315). Similarly, while the two or more mesh networks were split, the mobile nodes 110 of the first subset of mobile nodes were unable to receive event messages from the mobile nodes of the second subset of mobile nodes. However, once the listening node 310 reconnects to the mesh network (or the two mesh networks merge), the listening node become able to resynchronize the event messages with other nodes of the mesh network.

To resynchronize, the listening node 310 sends 360 a resynchronization request to a sending node 315. In some embodiments, the resynchronization request includes a timestamp identifying a resynchronization time period. For example, the time period may be determined based on a timestamp of the last event message received by the listening node 310, or a timestamp corresponding to when the listening node 310 disconnected from the mesh network 160.

The sending node 315 receives 365 the resynchronization request, identifies 370 a set of event messages not received by the listening node 310, and forwards 375 the identified event messages to the listening node 310. In some embodiments, upon receiving the resynchronization request, the sending node identifies events that have a timestamp after the timestamp included in the resynchronization request. For example, the events may be indexed within the event database 235 by timestamp, and the sending node 315 may query the event database 235 based on the timestamp included in the resynchronization request to retrieve the events to be sent to the listening node. As such, the amount of data transmitted between the listening node 310 and the sending node 315 for resynchronizing the event database 235 of the listening node 310 may be reduced, reducing battery utilization and increasing the connectivity of the listening node.

In some embodiments, the listening node 310 receives 380 the event messages from the sending node 315, records 385 the received event messages in the event database 235, and provides 390 the event message to other components of the mobile node for processing.

Event Structure

In some embodiments, events include distilled information from a data stream or data corpus. For example, an event may include distilled information identified from a video stream or an audio stream. In this example, instead of including the video stream that generated the event, the event message includes a limited amount of information such as a time associated with the event, a location associated with the event, and/or a location within the data stream or data corpus corresponding to the event (e.g., a frame or set of frames within a video that generated the event). For instance, an event may be generated when a mobile node 110 detects a gun in a video stream. Instead of including the video that shows the gun, the event message includes information corresponding to the location at which the gun was seen, a time when the gun was seen, and a frame number within a video where the gun can be seen. This reduces the amount of information to be transmitted between the mobile nodes 110 when event messages are being shared.

In some embodiments, each event message includes an identification or identification number. In some embodiments, the identification is a globally unique identification number (GUID). Additionally, each event message sent or forwarded by a mobile node includes a list of mobile nodes that has already received or seen the event message. For example, each mobile node may have a unique identifier and the event message may include a list of identifiers corresponding to the mobile nodes that have already received the event message. For example, before forwarding an event message, a mobile node may add itself to the list of mobile nodes that have already received the event message. Moreover, in some embodiments, upon receiving an event message, the mobile node may wait a set amount of time to allow for the same event message to be received from other mobile nodes, and updates the event message to include itself and all of the mobile nodes that sent duplicate event messages to the mobile node.

In addition, event messages may include a timestamp. The timestamp may allow nodes to order the events and may allow fast resynchronization of event database by reducing the amount of data to be shared when resynchronizing an event database. The timestamp may have a millisecond resolution. In other embodiments, certain types of event messages may have a sub-millisecond resolution. For example, event messages corresponding to audio streams may have a sub-millisecond resolution to allow for audio triangulation to be performed.

Notification Management

The notification management module 210 provides notifications to a user wearing a corresponding mobile node 110. In some embodiments, one or more notifications correspond to events for which the user of the mobile node receiving a corresponding event message needs to act on. In some embodiments, notifications have a sliding scale of urgency, as well as custom mappings that can be set ahead of time by an operator.

In some embodiments, a notification may correspond to an event that requires a user of a mobile node to acknowledge the receipt of the event. The notification management module 210 may track which events have been acknowledged and which have not. The notifications that have not been acknowledged may have a built-in escalation path, that allows for providing stronger notifications (e.g., including audio beyond video update, and sending a notification to peers in the system that have the option of teaming up to acknowledge the notification).

In other embodiments, a notification may correspond to an event that requires the user of the mobile node to create a new event that satisfy the needs created by the originating event. For instance, an event may correspond to a person of interest (POI) being identified in a video stream recorded by a camera of a mobile node 110. The event may require a user to take pictures of the POI face from various angles, and send the pictures to the HQ node 150.

Work-Share System

Due to weight and power restrictions, resources on a mobile computer may be limited. Certain processing tasks such as video and image processing can be high-resource tasks. For instance, a five-megapixel video feed that is 4 hours long may use around 34 gigabytes of data. Transmission of such video feed may consume a limited shared radio bandwidth and battery power. Further, processing and storage of such video may consume limited computational power and battery power.

In order to perform such resource intensive processing tasks, the tasks are distributed among multiple mobile nodes 110. For example, the work-share module 220 may reserve and coordinate graphical processing unit (GPU), central processing unit (CPU) and battery utilization, and may make requests to other mobile nodes for additional processing help.

Figure 4A:
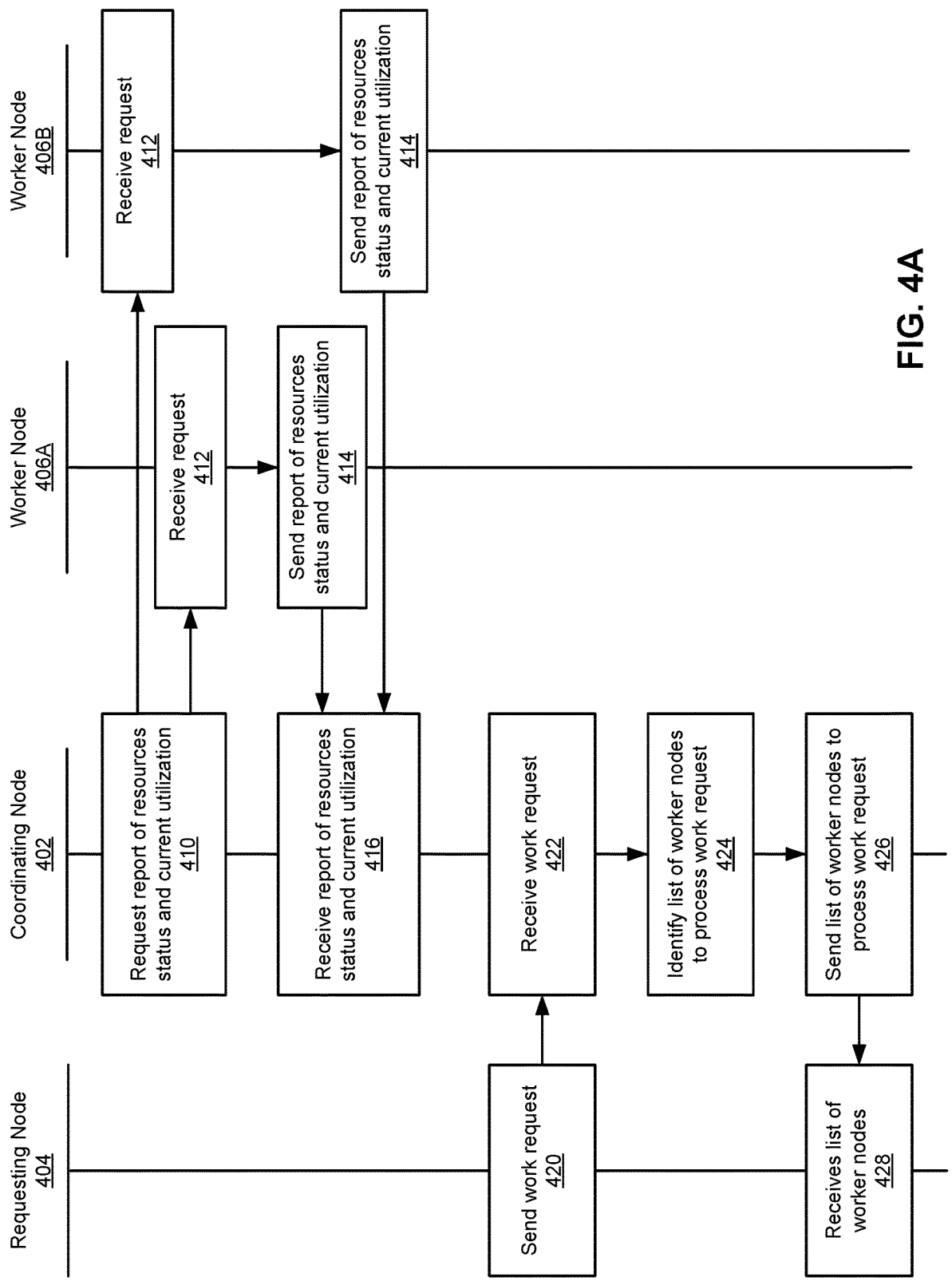

FIGS. 4A and 4B illustrate a process for sharing computational power among mobile nodes 110 of a squad 105, according to one or more embodiments. In some embodiments, each node may be a coordinating node 402, a requesting node 404, or a worker node 406. In some embodiments, the requesting node 404 may also be a worker node 406.

The coordinating node 402 regularly pings the worker nodes 406 within the squad 105 to request 410 a report of resource status and current utilization. Each of the worker nodes 406 that are reachable through the mesh network 160 receive 412 the request and sends 414 a report of resources status and current utilization. In some embodiments, the report of resource status includes a battery level of the corresponding worker node. The coordinating node 402 receives 416 the report from each of the worker nodes 406 and updates information stored for each of the worker nodes.

When the requesting node 404 identifies a resource intensive task to be performed, the requesting node 404 sends 420 a work request to the coordinating node 402. A resource intensive task may be one that is predicted to need relatively substantial processing resources, e.g., processing an image file or transmitting a large sized file. The coordinating node receives 422 the work request and processes the work request. In some embodiments, a work request includes data (such as an image or sensor data) associated with the request and one or more operations to be performed on the data. Alternatively, the work request may include a location of the data (such as an identification of a node the data can be retrieve from) instead of the data itself.

When the coordinating node 402 receives the work request from a requesting node 404, the coordinating node 402 identifies 424 and sends 426 to the requesting node 404 a list of worker nodes 406 that can take on tasks for completing the work request. In some embodiments, the list of worker nodes 406 that can take on tasks for completing the work request is identified based on a battery level of each of the worker nodes. Moreover, the list of worker nodes 406 that can take on tasks for completing the work request is identified based on a processor utilization rate of each of the worker nodes, and a radio connectivity between each of the worker nodes and the requesting node. In some embodiments, the worker nodes may be filtered or rank based on a score determined based on battery level, processor utilization rate, and radio connectivity to the requesting node.

The requesting node 404 receives 428 the list of worker nodes from the coordinating node 402, divides 430 the tasks for completing the work request into a set of buckets (e.g., processing buckets), and sends 432 tasks from each of the buckets to a corresponding worker node included in the list of worker nodes received from the coordinating node. As used herein, a processing bucket or a bucket may be a data structure (e.g., an array, a list, a stack, or any other suitable data structure) that identifies a group of processing tasks. In some embodiments, the requesting node 404 divides the tasks in a manner that ensures a worker node 406 receives contiguous data for each request, as continuity is often important for image tracking and other context-based tasks. In some embodiments, the requesting node assigns each bucket to a worker node included in the list of worker nodes received from the coordinating node and sends tasks from each of the buckets to a corresponding worker node. For instance, the requesting node 404 may send a task from a first bucket to a first worker node 406A, and may send a task from a second bucket to a second worker node 406B.

Each worker node 406 receives a task from the requesting node 404 and sends 436 a request to the requesting node 404 for data associated with the received task. The requesting node 404 receives 438 the request for data from the worker node and sends 440 the corresponding data to the worker node 406. The worker node 406 receives 442 the data for performing the received task and performs 444 the task using the received data. In some embodiments, the details needed by the worker node 406 are contained within the task received from the requesting node 404. For instance, if an image is to be scanned, the task may be marked with a "scan image" tag, and the body of the task may contain the name and location of the image.

In some embodiments, upon completion of the task, the worker node sends 446 a notification of completion to the requesting node 404. The requesting node 404 receives 448 the notification of completion from the worker node 406 and removes 450 the corresponding task from the corresponding bucket. In some embodiments, the requesting node sends the next task from the bucket corresponding to the worker node 406 that sent the notice of completion to the worker node. This may be repeated until the bucket is empty.

In some embodiments, in the process of distributing work, one work bucket may empty before the others. Once that happens the requesting node 404 may re-divide the remaining tasks among the buckets to spread the effort. In some embodiments, there may be a regular check at time-based intervals or a check that happens when one bucket empties or falls below a predefined threshold.

In some embodiments, if a task does not complete, after all other buckets are empty, the task is assigned to another work bucket to allow for another worker node 406 to make an attempt at completing the task. If task fails to be completed after too many attempts, the task may be canceled and an event of "work failure" may be recorded by the event module.

In some embodiments, when the requesting node 404 is dividing the workload amongst the buckets, the requesting node 404 may take several factors into account. For instance, some tasks may be more processor intensive and therefore cause a greater battery drain on the worker node assigned to that bucket. If a bucket is considered a "high load" bucket, the bucket may be held for assignment to the worker node that has the highest available battery among the squad. Alternatively, or in addition, some tasks may require a particular piece of hardware or software that a subset of worker nodes within the squad possess. This is also taken into account when dividing the workload and assigning to an appropriate worker node. In some embodiments, if there is no suitable worker node for performing a specific task, that information is sent to the notification management module 210, to alert the user of the requesting node 404 that tasks were unable to be completed along with the details on the deficiency.

In some embodiments, worker nodes may try to keep connectivity to the coordinating node 402. If the coordinating node 402 becomes unavailable, the worker nodes 406 derive a new coordinating node 402 from the nodes the worker nodes 406 are able to connect with. This nomination happens automatically, and the role of coordinating node 402 is taken by the node that had the highest connectivity metrics for the most recent coordinating node. In some embodiments the connectivity metric measures how well a device can hear a signal from an access point. For example, the connectivity metric may be a Received Signal Strength Indicator (RSSI). This reduces the reconnection cost when the original coordinating node comes back into reach of the mesh network.

Network Management

Radio communications (e.g., in the 2.4 Ghz, 3G, 4G, 5G or higher spectrum) may be power limited and sensitive to distance and interference. For example, WIFI connected nodes typically use a fixed access point (AP) and semi-fixed computers (e.g., sitting on desks). In contrast, for mobile nodes (such as nodes carried by a soldier in a gunfight), the access point is mounted on one soldier who is running among buildings, and another soldier running between high-metal-content tanks or vehicles, creating a very challenging, if not impossible network path between these two nodes.

WIFI radio frequencies can travel through various objects. However, WIFI radio frequencies may be blocked by objects that are made of metal, or metal screening, or if there is high density of water or wood between the two endpoints. Given the wide range of environments a user of a mobile node (such as a soldier in the field) may find themselves in, a mobile node 110 may find itself with no effective direct-path for radio communication to reach one or more other nodes 110 in a squad 105.

In order to increase the connectivity between mobile nodes 110 in a squad 105, a mesh network between the mobile nodes 110 is created. In some embodiments, the mesh network is configured such that every mobile node 110 is capable of being an access point (AP). Moreover, the mesh network may be configured such that each mobile node 110 is connected to at least one other mobile node that is within a wireless range of the mobile node 110. In some embodiments, the mesh network includes a commanding node and multiple follower nodes. Alternatively, in an alternate configuration, the mesh network, every mobile node 110 is a peer node and none of the nodes act as a commanding node. In time configurations, a peer node may temporarily become a commanding node at specified time intervals to re-establish or maintain the mesh network and to update the information for maintaining the mesh network. For example, at set or random time intervals, a peer node may broadcast an update request to peer nodes. During this period, the node that sent the update request may temporarily become a commanding node and may receive information from each of the peer nodes and may provide updated information to each of the nodes connected to the mesh network. Moreover, in this configuration, any peer node may become the temporary commanding node by broadcasting an update request. In some embodiments, the timing for broadcasting update requests may be controlled by a predefined scheme to reduce the likelihood of collisions and to reduce the amount of data being shared during the update period.

Figure 5A:
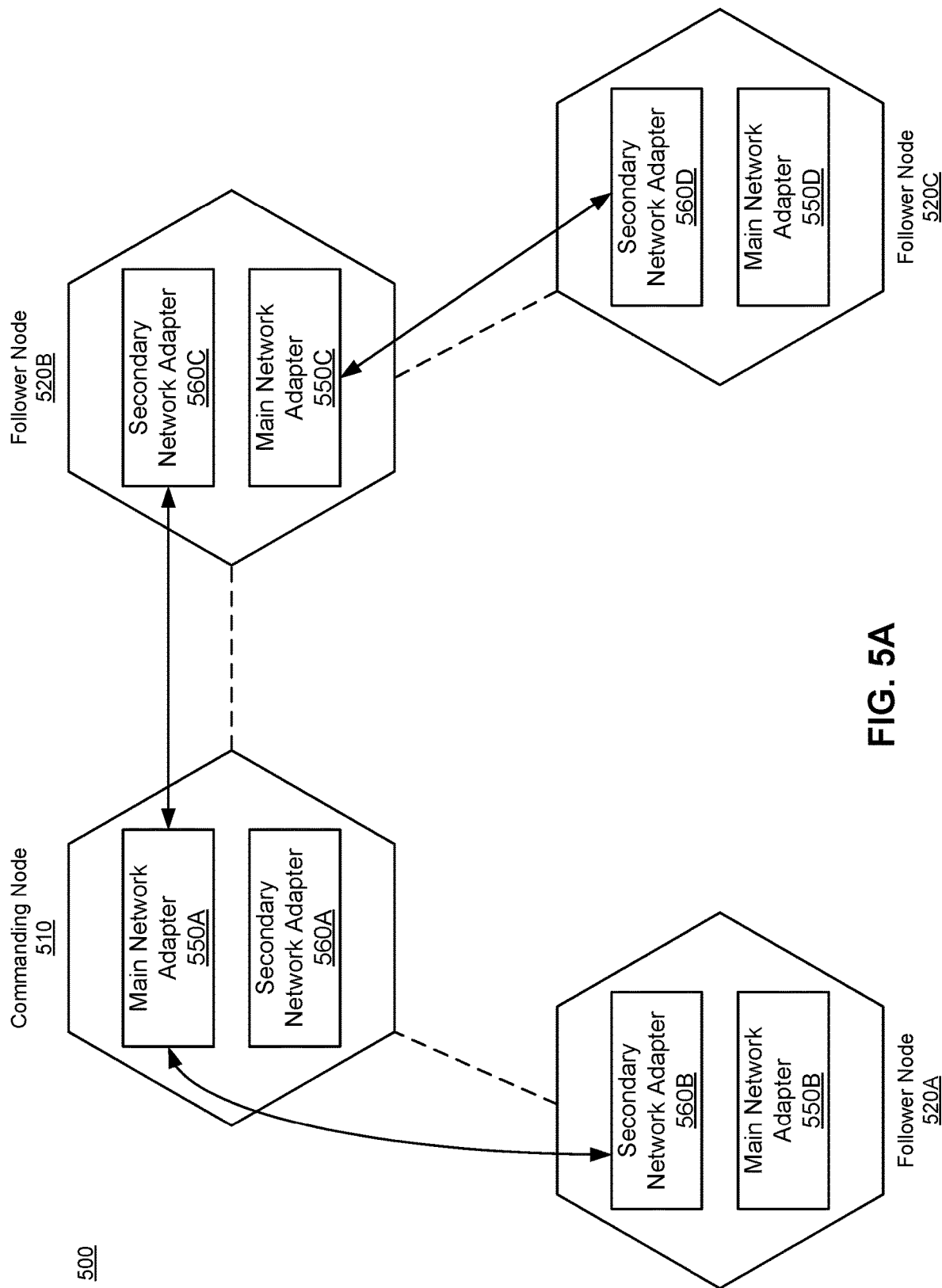
FIG. 5A illustrates a diagram of a mesh network having four nodes, according to one or more embodiments.
Figure 5B:
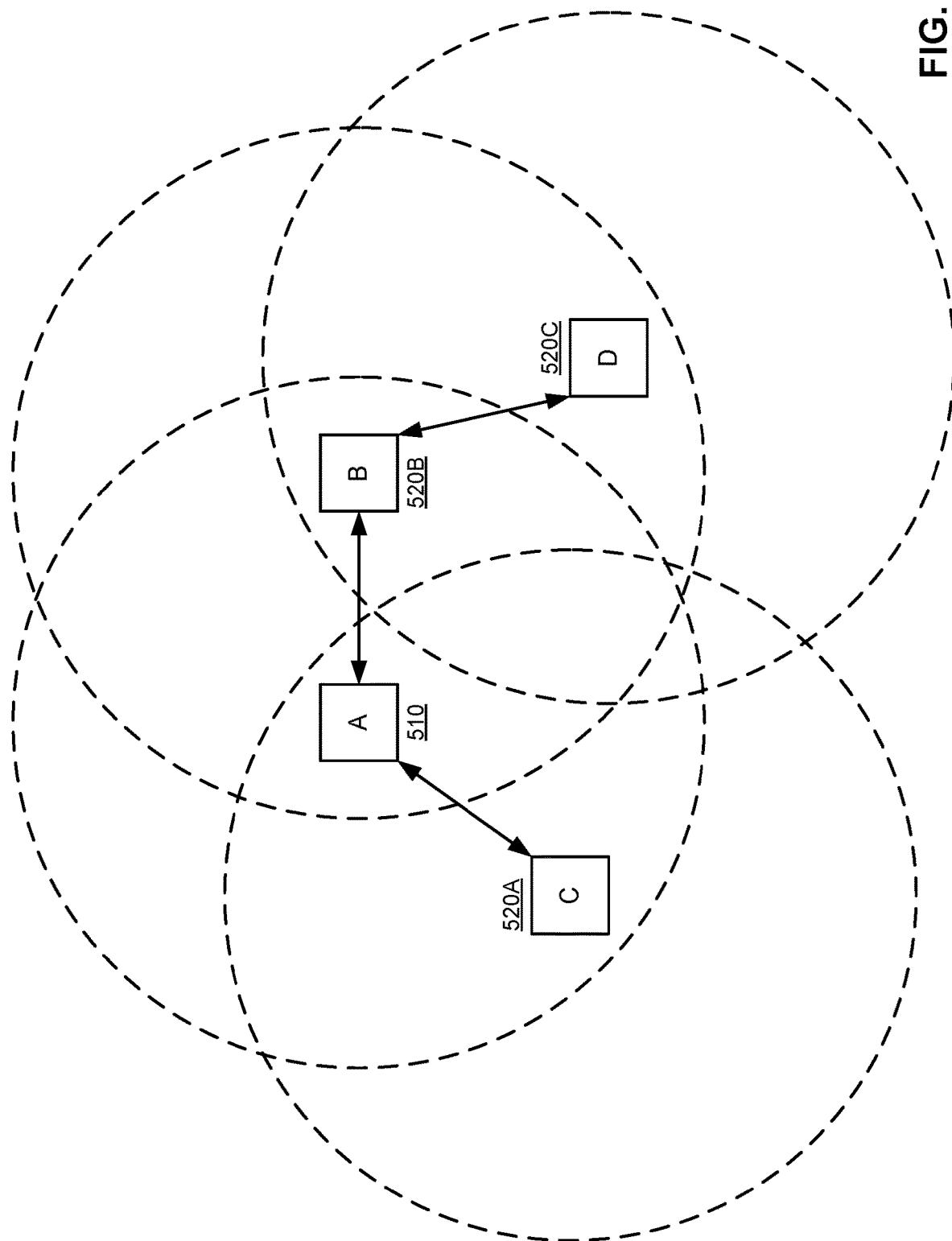
FIG. 5B illustrates a diagram showing the range of each node within the mesh network, according to one or more embodiments.

FIG. 5A illustrates a diagram of a mesh network having four nodes, according to one or more embodiments. FIG. 5B illustrates a diagram showing the range of each node within the mesh network, according to one or more embodiments. However, a mesh network may have any number of nodes. In the example of FIG. 5A, the mesh network has a commanding node 510 and three follower nodes 520.

Each node (including the commanding node and each of the follower nodes) have a main network adapter 550 and a secondary network adapter. In some embodiments, the main network adapter is configured to be an access point that other mobile nodes 110 can connect to. Moreover, the secondary network adapter 560 may be used to connect to other mobile nodes.

In some embodiments, the mesh network 500 is configured such that every mobile node 110 is capable of being an access point (AP). Moreover, the mesh network 500 may be configured such that each mobile node 110 is connected to at least one other mobile node that is within a wireless range of the mobile node 110. As such, even when a follower node 520 is not within the range of the commanding node 510, the follower node may be within the range of another follower node that is connected to the commanding node (either directly connected to the commanding node, or indirectly connected through one or more other follower nodes).

For example, in the configuration of FIGS. 5A and 5B, the main network adapter 550A of the commanding node 510 acts as an access point that allows other nodes that want to be part of the mesh network 500 to connect to. In this example, the first follower node 520A and the second follower node 520B are within the range of the commanding node 510. As such, the second network adapter 560B of the first follower node 520A is connected to the main network adapter 550A of the commanding node 510. Similarly, the second network adapter 560C of the second follower node 520B is connected to the main network adapter 550A of the commanding node 510. Thus, the first follower node 520A and the second follower node 520B are able to communicate with the commanding node 510. Moreover, the first follower node 520A may be able to communicate with the second follower node 520B through the commanding node 510.

In some embodiments, nodes that are outside of the range of the commanding node (such as the third follower node 520C in the example of FIGS. 5A and 5B), are able to connect to another follower node 520 that is connected to the mesh network. To enable this, each follower node 520 may include a network adapter that can act as an access point to accept connections from other follower nodes. For example, each follower node may include a main network adapter 550 that may allow other nodes to connect to. As such, since the third follower node 520C is within the range of the second follower node 520B, the secondary network adapter 560D of the third follower node 520C connects to the main network adapter 550C of the second follower node 520B. As such, the third follower node 520C is able to communicate with the second follower node 520B. Moreover, the third follower node 520C is able to communicate with the commander node 510 through the second follower node 520B. That is, the third follower node 520C is able to send messages directed to the commander node 510 to the second follower node 520B and the second follower node 520B forwards the messages to the commander node accordingly. Similarly, the commander node 510 can send messages directed to the third follower node 520C to the second follower node 520B and the second follower node 520B forwards the message to the third follower node 520C accordingly.

In some embodiments, a chain of follower nodes 520 can be arbitrarily long, and with each update, each node may register their available ports through Network Address Translation (NAT) registry events. Each NAT change may propagate to the commander node 510, so that all nodes are addressable by the broader network. In some embodiments, the NAT for each node may record only the closest hop, as the port-mapping within the NAT will automatically propagate data from one NAT-node to the next.

Mesh Network Creation

In some embodiments, to create the mesh network 500, the mobile nodes 110 within the squad 105 automatically and periodically identify a hierarchy of signal strength with the currently nominated commanding node 510. Once the connections are set (e.g., between the follower nodes 520 and the commanding node 510, or between follower nodes 520), the connections are periodically monitored. If a node detects a change in mesh network conditions, the mobile nodes 110 re-investigate the mesh network to rebuild the mesh network. In some embodiments, the mobile nodes determine if one or more mesh network properties have degraded below a threshold. For example, nodes may determine whether a signal strength between two nodes in the mesh network (e.g., a follower node to commanding node connection, or a follower node to follower node connection) falls below a threshold amount.

In some embodiments, the commanding node 510 periodically broadcasts a beaconing message to other nodes connected to the mesh network 500. In some embodiments, the beaconing message is a keep-alive message. The mobile nodes 110 that are within the range of the commanding node 510 are able to receive the beaconing message and connect to the commanding node 510 (e.g., connect to the access point established by the main network adapter 550A of the commanding node). Moreover, the mobile nodes 110 that are within the range of the commanding node 510 may be able to measure a strength of a connection to the commanding node 510 (e.g., by measuring a received signal strength indicator (RSSI) from the beaconing message). In some embodiments, each mobile node updates a connection strength value upon receiving the beaconing message and calculation the strength of the connection between the mobile node and the commanding node 510. Other nodes connected to the mesh network 510 may be able to query or request the current connection strength between each of the follower nodes 520 and the commanding node.

In some embodiments, when trying to join the mesh network 500, each follower node attempts to connect to the commanding node 510. If a follower node 520 is unable to directly connect to the commanding node 510, the follower node 520 may attempt to connect to another follower node 520 that has a current connection to the commanding node (either directly or indirectly connected to the commanding node 510). For example, the follower node 520 trying to connect to the mesh network 500 may send requests to other nodes the follower node is within range of. The follower node 520 may connect to the access points established by one or more of other nodes located in the vicinity of the follower node. In some embodiments, the follower node may measure the signal strength of each node the follower node is within range of. Alternatively, or in addition, the follower node requests or determines a connection score for each of the nodes the follower node is within range of. The connection score may be determined based on a connection strength of a node to the commanding node 510, a length of the connection chain between the node and the commanding node (e.g., a number of nodes connected between the node and the commanding node), or a combination there of.

In some embodiments, if a follower node 520 fails to receive a set number of beaconing messages, the follower node may determine that the follower node has lost connection to the commanding node, and the follower node may attempt to re-establish a connection to the mesh network by attempting to connect to another node the follower node is within range of.

In other embodiments, the mesh network 500 does not have an assigned commanding node 510. Instead, at given time intervals (e.g., at predetermined time intervals based on a set algorithm, or at random time intervals), one of the mobile nodes 110 connected to the mesh network may send a beaconing node to other mobile nodes connected to the mesh network. In some embodiments, a mobile node 110 that sends a beaconing message may temporarily become a commanding node 510 while the condition of the mesh network is being confirmed or analyzed.

In some embodiments, the beaconing message includes information about properties of the mesh network. For example, the beaconing message may include information about the number of nodes connected to the mesh network, or a hash value determined based on a set of properties for the mesh network. Moreover, each of the nodes receiving the beaconing message may compare the contents of the beaconing message to information stored by the network database 245 of the node. For example, the node may determine a hash value for the mesh network based on information stored in the network database of the node, and may compare the determined hash value with a hash value included in the beaconing message. If the node identifies a discrepancy between the contents of the beaconing message and the contents stored in the network database, the node may reply to the beaconing message with a message identifying the discrepancy. In some embodiments, the node that sent the beaconing message (e.g., the commanding node) and the node that identified the discrepancy may communicate with each other to resolve the discrepancy, and updates to the status of the mesh network may be broadcasted to other nodes of the mesh network.

In some embodiments, once a new node has connected to the mesh network 500, the new node registers its address (e.g., IP address) with the commending node 510. In other embodiments, the new node registers its address with one or more other nodes (e.g., other follower nodes or peer nodes) connected to the mesh network. In some embodiments, the address of the new node that may propagate through the mesh network until all of the nodes connected to the mesh network are aware of the new node.

Missing Commander Node

When the commanding node 510 is no longer available or becomes out of reach of the other nodes in the mesh network 500, the follower node 520 that had the most recent beaconing message from the most recent commanding node 510 becomes the new commanding node (e.g., temporary commanding node or local commanding node). In some embodiments, every node connected to the mesh network 500 maintain sufficient information to take over as commanding node at any time.

To recover from the loss of the commanding node 510 (e.g., as discovered by failing to receive beaconing messages from the commanding node 510), the nodes that are still connected to the mesh network 500 broadcast a request-commander message to other mobile nodes 110 of the squad 105. The nodes that are still reachable through the mesh network may respond with the latest RSSI they had for the most recent commanding node 510. The node with the strongest, most recent, beaconing ping, is then presumed to be the new commanding node by all nodes within the mesh network 500. Since this presumption algorithm is the same on all nodes, the selection of the new commanding node can be done without coordination or confirmation, and all events/messages that would have been routed to the old commanding are now routed to the new commanding node.

Upon receiving the RSSI values from each of the nodes that are reachable within the mesh network, a node determines whether its RSSI value is larger than any other RSSI values that are received. If so, the node automatically assumes the role of the commanding node and starts performing the operations of a commanding node. For example, once the node determines it has the largest RSSI value, it starts broadcasting beaconing messages to indicate to other nodes connected to it that it is still connected to the mesh network.

In some embodiments, when the former commanding node returns to the mesh network, the former commanding node synchronizes with the temporary commanding node to receive all events/messages that have occurred since the loss, enacting all of the normal event forwarding and event processing. Moreover, in some embodiments, if a temporary commanding node was handling data processing tasks, the task coordination may remain with the temporary commanding node until the data processing task is finished. This prevents any confusion about where to get data, and removes the need to synchronize the work buckets. In some embodiments, while the task coordination does not change, the returning commanding node provides pass-through communications to the temporary commanding node.

Computing Machine Architecture

Figure 6:
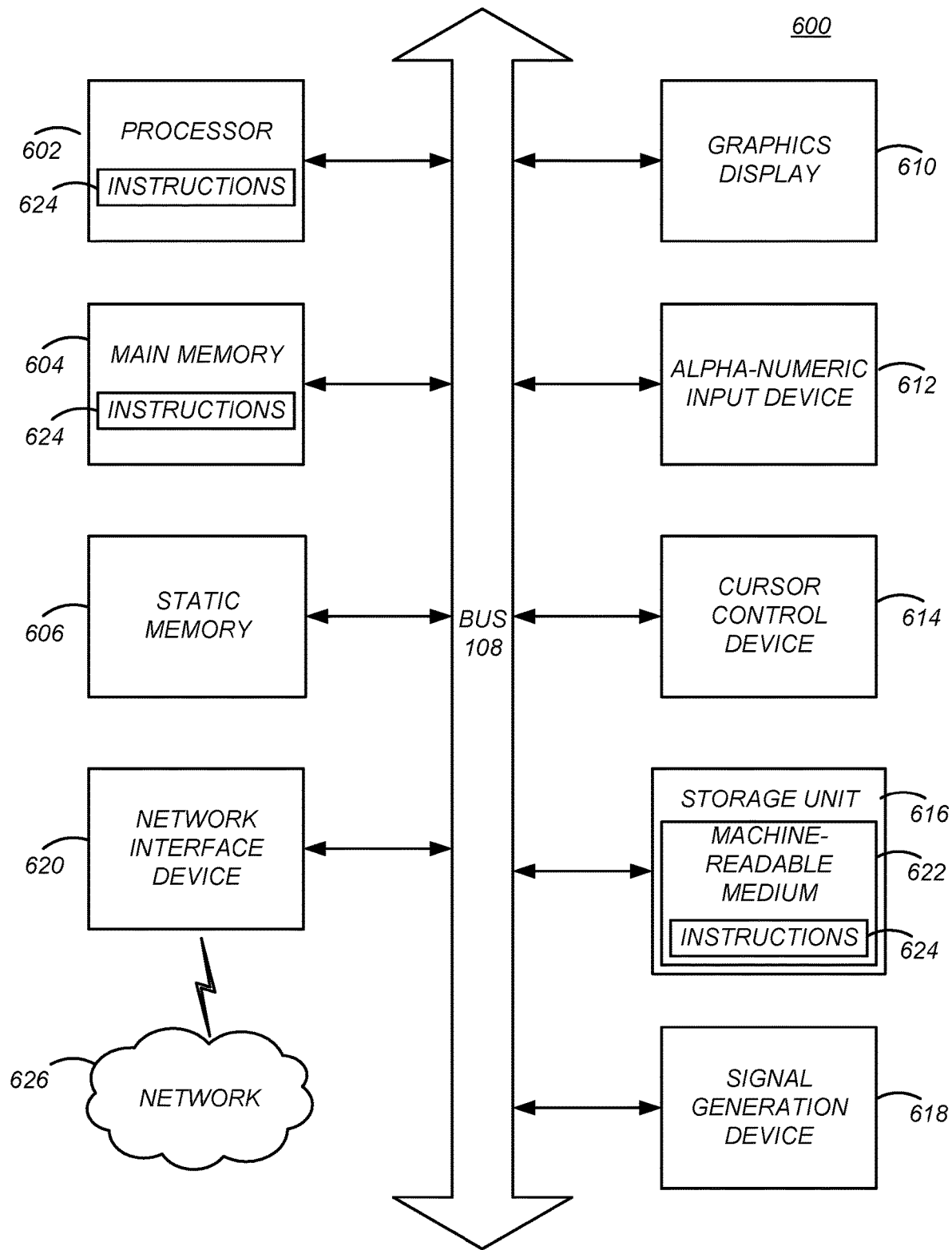
FIG. 6 is a block diagram illustrating components of an example machine able to read instructions from a machine-readable medium and execute them in a processor (or controller), according to one or more embodiments.

FIG. (FIG. 6 is a block diagram illustrating components of an example machine able to read instructions from a machine-readable medium and execute them in a processor (or controller), according to one or more embodiments. Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. In the context of a particular machine some or all the components illustrated and described with FIG. 6 may be applicable. For example, HQ 150 may use all or a substantial number of the components illustrated and described with FIG. 6, while a mobile node 110 may use a substantially few components.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 108. The computer system 100 may further include graphics display unit 610 (e.g., a plasma display panel (PDP), a liquid crystal display (LCD), a light emitting diode (LED) display, an organic light emitting diode (OLED) display, a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 116, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed system provides for close to or real-time updated data of an environmental surroundings in which processing resources are limited and network communication resources are limited. The data corresponding to environmental surroundings may include information physical environment as well as contextual information about the surroundings in that physical environment. By receiving this information in close to or at real time, a user present in those surrounding now is provided information otherwise unavailable to them to help them enhance their perception capabilities within that environment. The disclosed configurations enable groups of computing devices having limited capabilities (e.g., computing resource constraints (e.g., processor, memory), network communications constraints, and/or power source constraints (e.g., battery life and/or capacity)) to pool their capabilities together to enable the execution of resource intensive tasks. The execution of resource intensive tasks may provide for each time updates with computing devices such as information on heads up displays or augmented reality overlays of real time captured video. The disclosed configurations also provide for a scheme to enable multiple mobile computing systems to communicate with each other using an unreliable network with network properties that dynamically change as each of the nodes move with respect to each other. For example, as mobile nodes leave and enter networks, information may be dynamically updated amongst prior and new updated networks to provide new contextual information for all nodes within those respective networks.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium storing instructions, the instructions when executed by a computer system cause the computer system to:
    receive, by a listening node, an event message from a sending node, the listening node and sending node connected to a mesh network of nodes, the event message indicating an event detected by the sending node or another node of the mesh network, the event message including at least a list of nodes that have previously received the event message;
    record, by the listening node, the event of the event message in an event database of the listening node;
    update, by the listening node, the list of the event message to include an identifier of the listening node to indicate the listening node received the event message;
    identify, by the listening node, a set of nodes of the mesh network that are directly connected to the listening node and that are not included in the list of nodes that have previously received the event message; and
    forward, by the listening node, the event message to the identified set of nodes that are directly connected to the listening node and that are not included in the list of nodes that have previously received the event message, the forwarded event message including the updated list with the identifier of the listening node.

2. The non-transitory computer readable storage medium of claim 1, wherein the instructions further cause the computer system to:
    transmit the event message to an application being executed in the listening node for processing.

3. The non-transitory computer readable storage medium of claim 2, wherein the event message received by the listening node has an event message type from a preset list of event message types, and wherein transmitting the event message to the application being executed in the listening node comprises selecting the application based on the event message type of the received event message.

4. The non-transitory computer readable storage medium of claim 1, wherein the instructions further cause the computer system to:
    disconnect, by the listening node, from the mesh network;
    reconnect, by the listening node, to the mesh network;
    transmit, responsive to reconnecting to the mesh network, a resynchronization request to the sending node or another node of the mesh network connected to the listening node, the resynchronization request including a resynchronization timestamp;
    receive a set of event messages from the node connected to the listening node, the event messages of the set of event messages having timestamps after the resynchronization timestamp; and
    record events associated with each event message in the set of event messages received from the node connected to the listening node in the event database.

5. The non-transitory computer readable storage medium of claim 4, wherein the resynchronization timestamp is based on a timestamp of a latest event message received by the listening node.

6. The non-transitory computer readable storage medium of claim 4, wherein the resynchronization timestamp is based on a time when the listening node disconnected from the mesh network.

7. The non-transitory computer readable storage medium of claim 1, wherein the listening node and the other nodes connected to the mesh network are configured to be moved around a geographically bounded area, and wherein as the listening node and the other nodes connected to the mesh network move around the geographically bounded area, a quality of a connection between each node to the mesh network changes.

8. The non-transitory computer readable storage medium of claim 1, wherein the instructions further cause the computer system to:
    responsive to receiving the event message, wait, by the listening node, a threshold amount of time;
    receive, by the listening node and due to the waiting, the event message from one or more other sending nodes connected to the mesh network; and
    update, by the listening node based on the event message from the sending node and the one or more other sending nodes, the list of the event message to include identifiers of the one or more other sending nodes to indicate the one or more other sending nodes have received the event message.

9. A listening node communicably coupled to one or more nodes through a mesh network, the listening node configured to:
    receive an event message from a sending node, the sending node connected to the mesh network, the event message indicating an event detected by the sending node or another node of the mesh network, the event message including at least a list of nodes that have previously received the event message;
    record the event of the event message in an event database;
    update the list of the event message to include an identifier of the listening node to indicate the listening node received the event message;
    identify a set of nodes that are directly connected to the listening node and that are not included in the list of nodes that have previously received the event message; and
    forward the event message to the identified set of nodes that are directly connected to the listening node and that are not included in the list of nodes that have previously received the event message, the forwarded event message including the updated list with the identifier of the listening node.

10. The listening node of claim 9, wherein the listening node is further configured to:
    transmit the event message to an application being executed in the listening node for processing.

11. The listening node of claim 10, wherein the event message received by the listening node has an event message type from a preset list of event message types, and wherein transmitting the event message to the application being executed in the listening node comprises selecting the application based on the event message type of the received event message.

12. The listening node of claim 9, wherein the listening node is further configured to:
    transmit, responsive to disconnecting and reconnecting to the mesh network, a resynchronization request to the sending node or another node of the mesh network connected to the listening node, the resynchronization request including a resynchronization timestamp;
    receive a set of event messages from the node connected to the listening node, the event messages of the set of event messages having timestamps after the resynchronization timestamp; and
    record events associated with each event message in the set of event messages received from the node connected to the listening node in the event database.

13. The listening node of claim 12, wherein the resynchronization timestamp is based on one of a timestamp of a latest event message received by the listening node, and a time when the listening node disconnected from the mesh network.

14. The listening node of claim 9, wherein the listening node and the one or more nodes connected to the mesh network are configured to be moved around a geographically bounded area, and wherein as the listening node and the one or more nodes connected to the mesh network move around the geographically bounded area, a quality of a connection between each node to the mesh network changes.

15. A method comprising:
    receiving, by a listening node, an event message from a sending node, the listening node and sending node connected to a mesh network of nodes, the event message indicating an event detected by the sending node or another node of the mesh network, the event message including at least a list of nodes that have previously received the event message;
    recording, by the listening node, the event of the event message in an event database of the listening node;
    updating, by the listening node, the list of the event message to include an identifier of the listening node to indicate the listening node received the event message;
    identifying, by the listening node, a set of nodes of the mesh network that are directly connected to the listening node and that are not included in the list of nodes that have previously received the event message; and
    forwarding, by the listening node, the event message to the identified set of nodes that are directly connected to the listening node and that are not included in the list of nodes that have previously received the event message, the forwarded event message including the updated list with the identifier of the listening node.

16. The method of claim 15, further comprising:
    transmitting the event message to an application being executed in the listening node for processing.

17. The method of claim 16, wherein the event message received by the listening node has an event message type from a preset list of event message types, and wherein transmitting the event message to the application being executed in the listening node comprises selecting the application based on the event message type of the received event message.

18. The method of claim 15, further comprising:
    disconnecting, by the listening node, from the mesh network;
    reconnecting, by the listening node, to the mesh network;
    transmitting, responsive to reconnecting to the mesh network, a resynchronization request to the sending node or another node of the mesh network connected to the listening node, the resynchronization request including a resynchronization timestamp;
    receiving a set of event messages from the node connected to the listening node, the event messages of the set of event messages having timestamps after the resynchronization timestamp; and
    recording events associated with each event message in the set of event messages received from the node connected to the listening node in the event database.

19. The method of claim 18, wherein the resynchronization timestamp is based on a timestamp of a latest event message received by the listening node.

20. The method of claim 18, wherein the resynchronization timestamp is based on a time when the listening node disconnected from the mesh network.

21. The method of claim 15, wherein the listening node and the other nodes connected to the mesh network are configured to be moved around a geographically bounded area, and wherein as the listening node and the other nodes connected to the mesh network move around the geographically bounded area, a quality of a connection between each node to the mesh network changes.

* * * * *

UNITED STATES PATENT AND TRADEMARK OFFICE
CERTIFICATE OF CORRECTION

PATENT NO. : 12,200,040 B2
APPLICATION NO. : 17/681474
DATED : January 14, 2025
INVENTOR(S) : Amacker et al.

Page 1 of 1

It is certified that error appears in the above-identified patent and that said Letters Patent is hereby corrected as shown below:

On the Title Page

Item (57), in Column 2, under "ABSTRACT", Line 13, delete "form" and insert -- from --, therefor.

Signed and Sealed this
Twenty-ninth Day of April, 2025

Coke Morgan Stewart
*Acting Director of the United States Patent and Trademark Office*